US009946555B2

(12) United States Patent
Murray et al.

(10) Patent No.: US 9,946,555 B2
(45) Date of Patent: *Apr. 17, 2018

(54) ENHANCED CONFIGURATION AND PROPERTY MANAGEMENT SYSTEM

(71) Applicant: Bank of America Corporation, Charlotte, NC (US)

(72) Inventors: David George Murray, Ellenwood, GA (US); Timothy J. Hope, Loganville, GA (US); Yifei Zhu, Alpharetta, GA (US); Gerardo Saenz, Jr., O'Fallon, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,858

(22) Filed: Oct. 24, 2016

(65) Prior Publication Data
US 2017/0046175 A1 Feb. 16, 2017

Related U.S. Application Data

(63) Continuation of application No. 14/792,408, filed on Jul. 6, 2015, now Pat. No. 9,519,505.

(51) Int. Cl.
G06F 9/455 (2006.01)
G06F 9/44 (2018.01)
(Continued)

(52) U.S. Cl.
CPC ............ *G06F 9/4416* (2013.01); *G06F 9/442* (2013.01); *G06F 9/45558* (2013.01); *G06F 9/50* (2013.01);
(Continued)

(58) Field of Classification Search
None
See application file for complete search history.

(56) References Cited

U.S. PATENT DOCUMENTS 5,187,750 A 2/1993 Behera
5,701,137 A 12/1997 Kiernan et al.
(Continued)

FOREIGN PATENT DOCUMENTS

WO 2009012320 A2 1/2009

OTHER PUBLICATIONS

PCT International Search Report and Written Opinion dated Mar. 28, 2008, issued in corresponding International Patent Application No. PCT/US2007/083087.
(Continued)

*Primary Examiner* — Hiren Patel
(74) *Attorney, Agent, or Firm* — Michael A. Springs; Moore & Van Allen PLLC; Peter B. Stewart

(57) ABSTRACT

Embodiments of the invention are directed to systems, methods and computer program products for creating and managing a virtual operating environment on a physical machine connected to a distributed network, the virtual operating environment is virtualized by the physical machine. The invention may categorize the virtual operating environment using a tiered data structure, where each tier of the tiered data structure defines an attribute for categorizing the virtual operating environment. The invention generates a graphical representation of the tiered data structure for display via a user computing device that enables a user to communicate requests for causing the virtual operating environment to perform a function and communicates commands to the physical machine based on receiving such
(Continued)

requests. The invention may additionally update the graphical representation after the virtual operating environment has executed the function.

20 Claims, 8 Drawing Sheets

(51) Int. Cl.
| | | |
|---|---|---|
| H04L 29/08 | (2006.01) | |
| G06F 11/14 | (2006.01) | |
| G06F 11/22 | (2006.01) | |
| G06F 21/57 | (2013.01) | |
| G06F 9/50 | (2006.01) | |
| G06F 21/31 | (2013.01) | |

(52) U.S. Cl.
CPC ...... *G06F 11/1441* (2013.01); *G06F 11/1451* (2013.01); *G06F 11/1484* (2013.01); *G06F 11/2289* (2013.01); *G06F 21/575* (2013.01); *H04L 67/025* (2013.01); *H04L 67/10* (2013.01); *G06F 21/31* (2013.01); *G06F 2009/4557* (2013.01); *G06F 2009/45562* (2013.01); *G06F 2009/45595* (2013.01); *G06F 2201/815* (2013.01); *G06F 2201/84* (2013.01)

(56) References Cited

U.S. PATENT DOCUMENTS

| | | |
|---|---|---|
| 6,348,935 B1 | 2/2002 | Malacinski et al. |
| 6,405,215 B1 | 6/2002 | Yaung |
| 7,383,327 B1 | 6/2008 | Tormasov et al. |
| 7,506,265 B1 | 3/2009 | Traut et al. |
| 7,523,187 B1 | 4/2009 | Lavallee et al. |
| 7,831,689 B2 | 11/2010 | Poisson et al. |
| 8,055,609 B2 | 11/2011 | Chen et al. |
| 8,280,716 B2 | 10/2012 | Haviv et al. |
| 8,375,354 B2 | 2/2013 | Shenfield et al. |
| 8,438,537 B2 | 5/2013 | Becker et al. |
| 8,448,170 B2 | 5/2013 | Wipfel et al. |
| 8,706,947 B1 | 4/2014 | Vincent |
| 8,732,287 B2 | 5/2014 | Lee et al. |
| 8,819,695 B2 | 8/2014 | Daute |
| 8,938,680 B2 * | 1/2015 | Soundararajan ......... G06F 8/38 709/224 |
| 9,015,712 B1 | 4/2015 | Hodge et al. |
| 9,134,992 B2 | 9/2015 | Wong et al. |
| 9,319,288 B2 | 4/2016 | Somaiya et al. |
| 9,426,026 B2 | 8/2016 | Rider |
| 9,519,505 B1 * | 12/2016 | Murray ..................... G06F 9/50 |
| 2002/0049963 A1 | 4/2002 | Beck et al. |
| 2002/0143865 A1 | 10/2002 | Tung Loo et al. |
| 2003/0120593 A1 | 6/2003 | Bansal et al. |
| 2003/0144873 A1 | 7/2003 | Keshel |
| 2003/0191849 A1 | 10/2003 | Leong et al. |
| 2004/0025157 A1 | 2/2004 | Blight et al. |
| 2004/0078105 A1 | 4/2004 | Moon et al. |
| 2004/0225865 A1 | 11/2004 | Cox et al. |
| 2004/0261060 A1 | 12/2004 | Haseiden et al. |
| 2005/0171899 A1 | 8/2005 | Dunn et al. |
| 2005/0216409 A1 | 9/2005 | McMonagle et al. |
| 2005/0240601 A1 | 10/2005 | Lyons et al. |
| 2006/0026199 A1 | 2/2006 | Crea |
| 2006/0031261 A1 | 2/2006 | Behringer |
| 2006/0039023 A1 | 2/2006 | Supra et al. |
| 2006/0039610 A1 | 2/2006 | Cantral |
| 2006/0206863 A1 | 9/2006 | Shenfield et al. |
| 2007/0094367 A1 | 4/2007 | Esfahany et al. |
| 2007/0179828 A1 | 8/2007 | Elkin et al. |
| 2007/0239749 A1 | 10/2007 | Farahbod |
| 2007/0266136 A1 | 11/2007 | Esfahany et al. |
| 2008/0140759 A1 | 6/2008 | Conner et al. |
| 2008/0140760 A1 | 6/2008 | Conner et al. |
| 2008/0140857 A1 | 6/2008 | Conner et al. |
| 2008/0201195 A1 | 8/2008 | Cohn et al. |
| 2008/0294648 A1 | 11/2008 | Lin et al. |
| 2009/0024713 A1 | 1/2009 | Strasenburgh et al. |
| 2009/0125796 A1 | 5/2009 | Day |
| 2009/0201812 A1 | 8/2009 | Dettori et al. |
| 2009/0249287 A1 | 10/2009 | Patrick |
| 2009/0319581 A1 | 12/2009 | Seifert |
| 2009/0327211 A1 | 12/2009 | McCune et al. |
| 2010/0017783 A1 | 1/2010 | Brininstool et al. |
| 2010/0023921 A1 | 1/2010 | Chaar et al. |
| 2010/0077068 A1 | 3/2010 | Saha et al. |
| 2010/0169150 A1 | 7/2010 | Gremont et al. |
| 2010/0189103 A1 | 7/2010 | Bachmann et al. |
| 2010/0199276 A1 | 8/2010 | Umbehocker |
| 2010/0242013 A1 | 9/2010 | Hao et al. |
| 2011/0023013 A1 | 1/2011 | Shenfield et al. |
| 2011/0173303 A1 | 7/2011 | Rider |
| 2011/0225118 A1 | 9/2011 | Wu et al. |
| 2011/0276636 A1 | 11/2011 | Cheng et al. |
| 2011/0276968 A1 | 11/2011 | Kand et al. |
| 2011/0283263 A1 | 11/2011 | Gagliardi et al. |
| 2011/0283278 A1 | 11/2011 | Murrell et al. |
| 2012/0016713 A1 | 1/2012 | Wilcock et al. |
| 2012/0053974 A1 | 3/2012 | Kulkarni et al. |
| 2012/0069131 A1 | 3/2012 | Abelow |
| 2012/0130963 A1 | 5/2012 | Luo et al. |
| 2012/0167057 A1 | 6/2012 | Schmich et al. |
| 2012/0216135 A1 | 8/2012 | Wong et al. |
| 2012/0254834 A1 | 10/2012 | Flurry et al. |
| 2012/0260228 A1 | 10/2012 | Mallick et al. |
| 2012/0278786 A1 | 11/2012 | Ruiz et al. |
| 2012/0297358 A1 | 11/2012 | Kumar et al. |
| 2012/0311475 A1 | 12/2012 | Wong |
| 2012/0324069 A1 | 12/2012 | Nori et al. |
| 2013/0019018 A1 | 1/2013 | Rice |
| 2013/0055092 A1 | 2/2013 | Cannon, III et al. |
| 2013/0104150 A1 | 4/2013 | Rdzak et al. |
| 2013/0110881 A1 | 5/2013 | Bender |
| 2013/0124253 A1 | 5/2013 | Cooper et al. |
| 2013/0151491 A1 | 6/2013 | Gislason et al. |
| 2013/0173768 A1 | 7/2013 | Kundu et al. |
| 2013/0219297 A1 | 8/2013 | Soundararajan et al. |
| 2013/0282746 A1 | 10/2013 | Balko et al. |
| 2013/0282798 A1 * | 10/2013 | McCarthy ............. G06F 9/5072 709/203 |
| 2014/0068600 A1 | 3/2014 | Ashok et al. |
| 2014/0075433 A1 | 3/2014 | Kotton |
| 2014/0195666 A1 | 7/2014 | Dumitriu et al. |
| 2014/0223431 A1 | 8/2014 | Yoshimura et al. |
| 2015/0074536 A1 | 3/2015 | Varadharajan et al. |
| 2015/0188775 A1 | 7/2015 | Van Der Walt et al. |
| 2015/0229546 A1 | 8/2015 | Somaiya et al. |
| 2015/0254364 A1 | 9/2015 | Piduri et al. |
| 2016/0062783 A1 | 3/2016 | Falkco |
| 2016/0127307 A1 | 5/2016 | Jain et al. |

OTHER PUBLICATIONS

Canadian Office Action dated Mar. 26, 2014 for Application No. 2,667,798.
European Examination Report dated Sep. 16, 2013 for Application No. 07854530.8.
European Oral Proceedings dated May 20, 2014 for Application No. 07854530.8.
European Patent Examination Report dated Feb. 11, 2011 for Application No. 07 854 530.8.
Garfinkel, Tal et al., Terra: A Vitual Machine-Based Platform for Trusted Computing, 2003, [Retrieved on Feb. 2, 2016]. Retrieved from the Internet: http://delivery.acm.org/10.1145/950000/945464/p193-garfinkel.pdf?; 14 Pages (193-206).
Guo, Li: Enacting a Decentralised Workflow Management System on a Multi-agent Platform, 2006, pp. 28-31.
Hollingsworth, D., "Workflow Management Coalition, The Workflow Reference Model", Internet Citation, [Online] Jan. 19, 1995, pp. 1-55, XP002218704, Retrieved from the Internet: URL:http://www.wfmc.org/standards/docs/ tc003v11.pdf> [retrieved on Oct. 29, 2002].

(56) References Cited

OTHER PUBLICATIONS

India Patent Office, First Examination Report for Application No. 1873/KOLNP/2009, dated Oct. 12, 2015, 2 pages.

Li, Guoli: Decentralized Execution of Event-Driven Scientific Workflow, 2006, pp. 1-7.

Madhusudan, Therani. et al.: "A Case-Based Reasoning Framework for Workflow Model Management", PUB—Data & Engineering, Jul. 1, 2004, Elsevier, NL, vol. 50, pp. 87-115, XP026976541, ISSN 0169-023X.

Nizzardini, Chris. "MySQL Temporary Tables Example—Optimizing PHP Applications"; http://blog.cnizz.com/2010/11/24/mysql-temporary-tables-example-optimizing-applications-with-temp-tables/, Nov. 24, 2010.

Paulley, Glenn. "Loading data in more flexible ways—part deux"; http://iablog.sybase.com/paulley/2009/07/loading-data-in-more-flexible-ways-part-deux/, Jul. 10, 2009.

VMware, Increase Longevity of IT solutions with VMware vSphere, Jul. 2010, [Retrieved on Feb. 2, 2015]. Retrieved from the Internet: http://www.wei.com/insights/VMware-IncreaseLongevityofITSolutionswithVMwarevSphere.pdf, 10 Pages (1-8).

Wikipedia, the free encyclopedia. Service-oriented architecture, http://www.en.wikipedia.org/wiki/Service-oriented_architecture. Downloaded from http://en.wikipedia.org/wiki/Service-oriented_architecture on May 21, 2013.

Wyatt, Len et al. "We Loaded 1TB in 30 Minutes with SSIS, and So Can You"; http://technet.microsoft.com/en-us/libraiy/dd537533, Mar. 2009.

Zhang, Chen: CloudWF: A computational Workflow System for Clouds Based on Hadoop, 2009, pp. 393-403.

htttps://api.jquery.com/ retrieved from the internet on Jul. 15, 2016, 36 pages.

htttps://api.jquery.com/data/ retrieved from the internet on Jul. 15, 2016; 6 pages.

* cited by examiner

ENHANCED CONFIGURATION AND PROPERTY MANAGEMENT SYSTEM

CROSS-REFERENCE TO PRIORITY APPLICATION

This application is a continuation of U.S. patent application Ser. No. 14/792,408 for an ENHANCED CONFIGURATION AND PROPERTY MANAGEMENT SYSTEM, filed Jul. 6, 2015, which is hereby incorporated by reference in its entirety.

FIELD OF THE INVENTION

The invention is directed to systems, methods and computer program products for creating and managing a virtual operating environment on a physical machine connected to a distributed network, the virtual operating environment being virtualized by the physical machine.

BACKGROUND

A physical computing device may be configured to simulate a virtualized machine where the virtualized machine utilizes hardware resources of the physical machine to operate. There exists a need for organizing and controlling virtualized machines over a network environment and creating new virtualized machines based on loading factors.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to systems, methods, and computer program products to create a virtual operating environment, wherein the virtual operating environment is hosted on a physical machine accessible via a distributed network, wherein the physical machine is configured to receive operational commands over the distributed network for controlling the virtual operating environment, wherein the virtual operating environment is virtualized by the physical machine, and wherein the virtual operating environment accesses hardware components of the physical machine to perform at least one preconfigured function.

In some embodiments, the invention is further configured to categorize the virtual operating environment using a tiered data structure, wherein each tier of the tiered data structure defines an attribute for categorizing the virtual operating environment, wherein each tier of the multiple tiered data structure may comprise one or more sub-tiers, thereby forming a parent/child relationship, wherein the sub-tier is associated with the attribute of each parent tier, wherein categorizing the virtual operating environment comprises assigning the virtual operating environment to a selected tier of the tiered data-structure such that the virtual operating environment is defined by the attribute of the selected tier and attributes of each parent tier of the selected tier.

In other embodiments, the invention is further configured to generate a graphical representation of the tiered data structure for display via a user computing device, wherein the graphical representation of the tiered data structure illustrates at least each of the tiers of the tiered data structure in a hierarchical format, and illustration of the physical machine displayed under at least one of the tiers of the tiered data structure, and an illustration of the virtual operating environment displayed under the illustration of the physical machine, wherein the illustration of the virtual operating environment enables a user to communicate an operational request to cause the virtual operating environment to perform a function associated with the operational request, wherein the illustration of the virtual operating environment comprises an operational status of the virtual operating environment.

While yet in other embodiments, the invention is further configured to communicate a command to the physical machine for causing the virtual operating environment to perform the function associated with the operational request based on the user interacting with the illustration of the virtual operating environment of the graphical representation of the tiered data structure.

Based on the virtual operating environment executing the function associated with the operational request, the invention may be configured to receive, from the virtual operating environment, an updated status, and update the illustration of the virtual operating environment based on receiving the updated status.

In other embodiments of the invention, the invention may be configured to receive authentication information of the user and validate the authentication information of the user, and where the invention is configured to communicate the command to cause the virtual operating environment to perform a function, communicating the command is further based on validating the authentication information of the user.

In some embodiments the function associated with the operational request may be at least one of a command to shut down the virtual operating environment, a command to startup the virtual operating environment, and a command to reboot the virtual operating environment.

In other embodiments, the illustration of the physical machine accessible via the distributed network enables the user to communicate a second request to perform at least one command to control the physical machine, and wherein the illustration of the physical machine displays a status of the remote machine.

In some embodiments, the invention may be further configured to receive the second request to perform the at least one command for controlling the physical machine based on the user interacting with the illustration of the physical machine; communicate an instruction to the physical machine, thereby causing the remote machine to execute a function associated with the at least one command to control the physical machine; and update the illustration of the physical machine.

While in other embodiments, the invention may be configured to identify a second virtual operating environment; determine that the second virtual operating environment operates in tandem with the virtual operating environment; receive a request to startup the second virtual operating environment; determine that the virtual operating environment is not running; communicate a command to the physical machine causing the virtual operating environment to startup; determine that the virtual operating environment is running; and communicate causing the second virtual operating environment to startup.

Additionally, the invention may be configured to identify that the virtual operating environment has experienced an error; and update the illustration of the virtual operating environment based on identifying the virtual operating environment has experienced an error.

While in other embodiments the invention is configured to create a plurality of copies of the virtual operating environment, wherein at least one of the plurality of copies of the virtual operating environment is a testing environment, and wherein at least one of the plurality of copies of the virtual operating environment is a production environment.

In yet further embodiments, the invention is further configured to create a trigger for communicating at least one of the operational commands to the physical machine; and communicate the at least one command of the list of commands based on an occurrence of the trigger and wherein the occurrence of the trigger is based on at least one of an occurrence of a predetermined period of time, and receiving a computer generated instruction over the distributed network.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
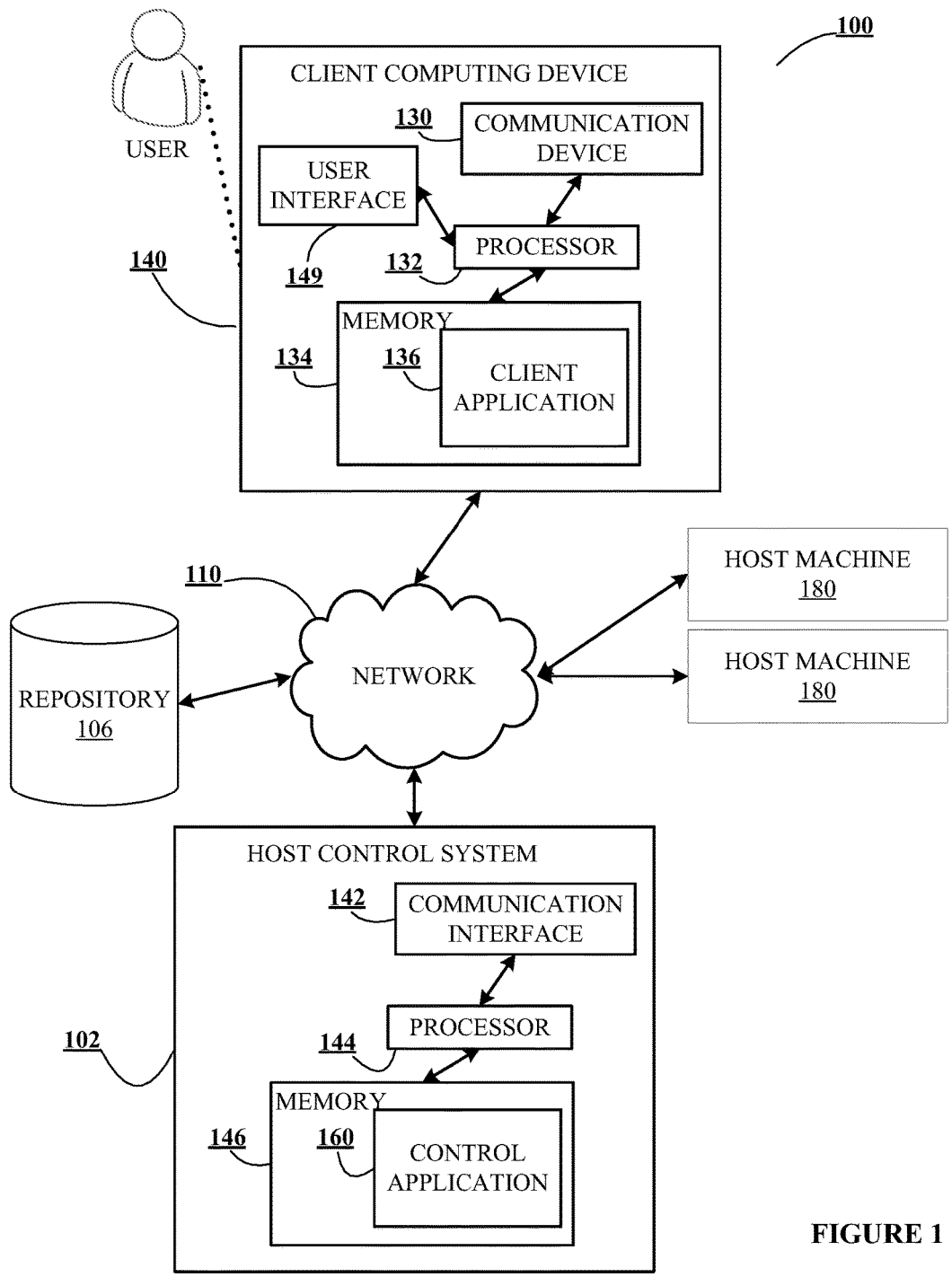
Figure 2A:
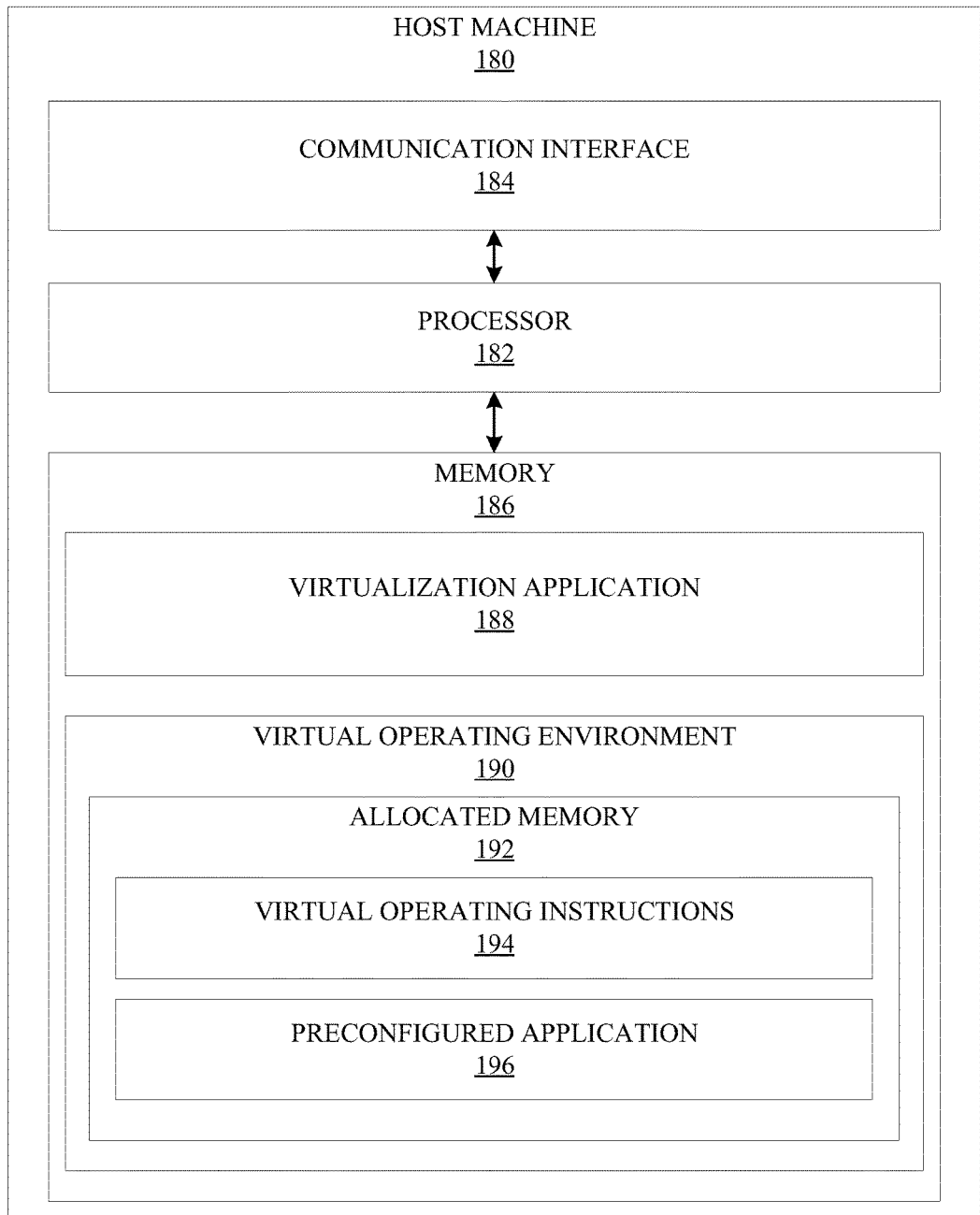
Figure 2B:
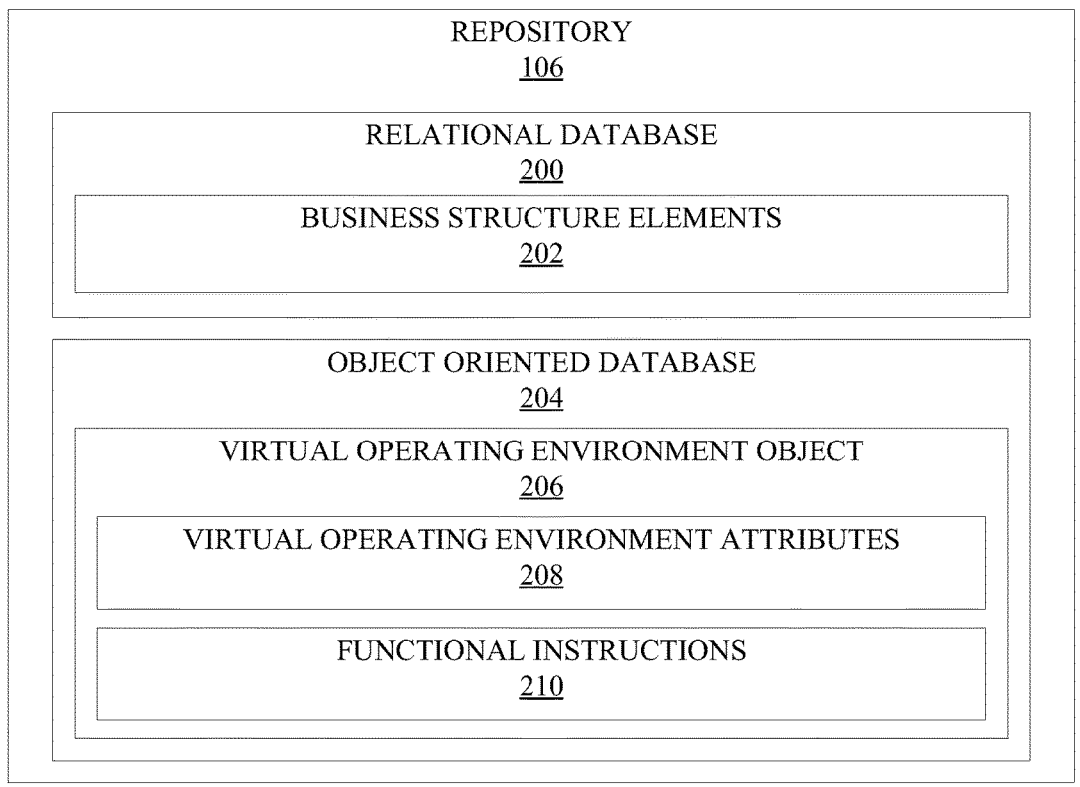
Figure 3:
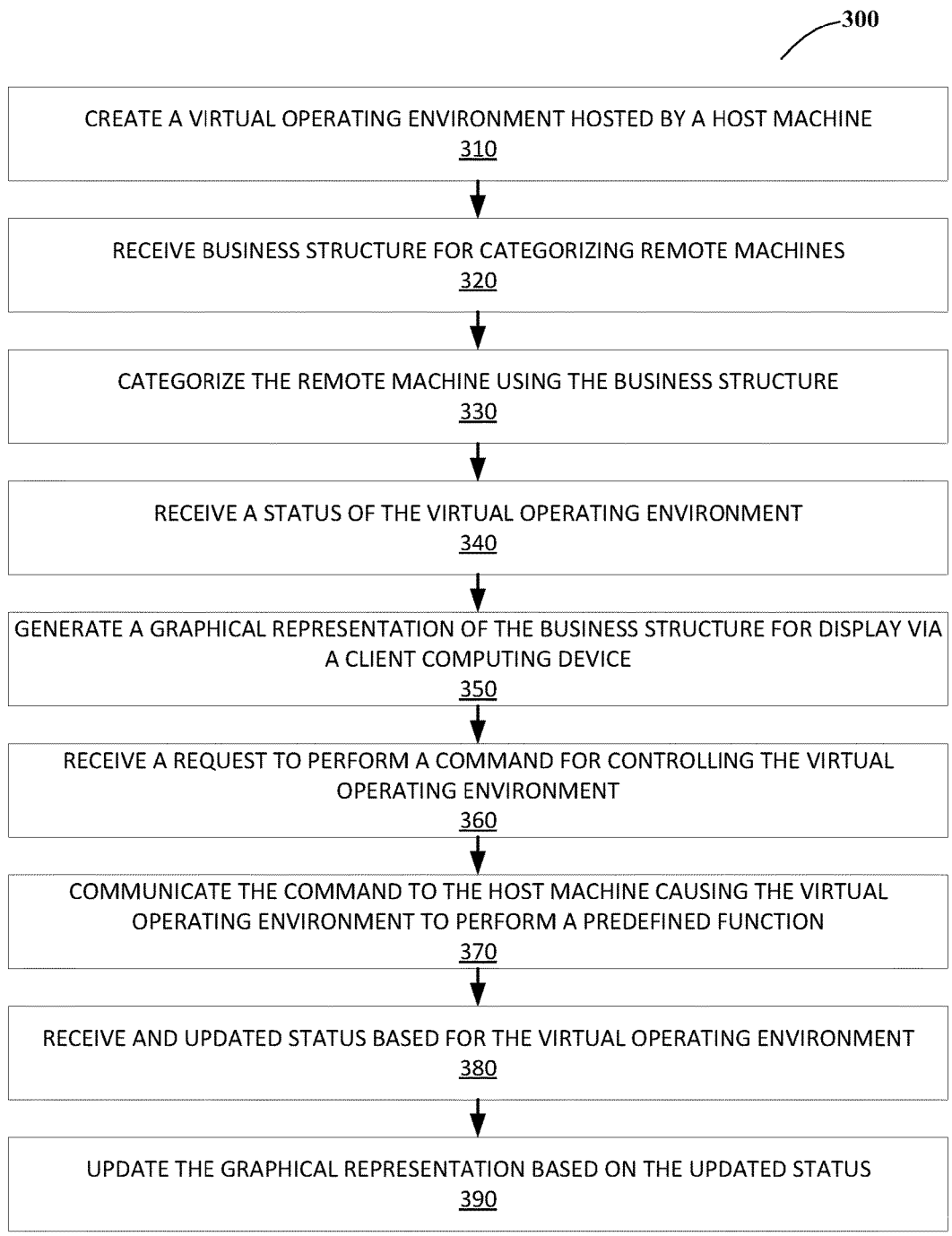
Figure 4:
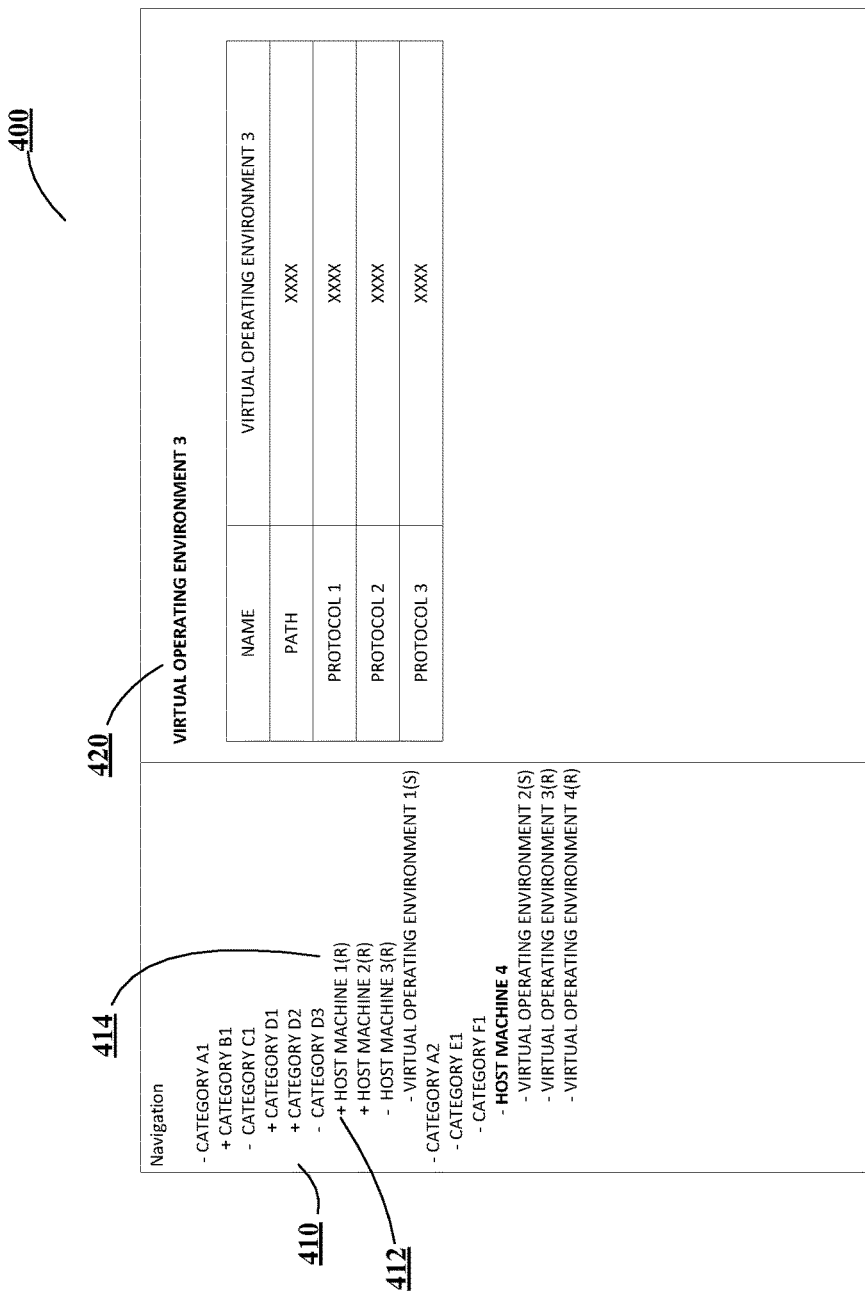
Figure 5:
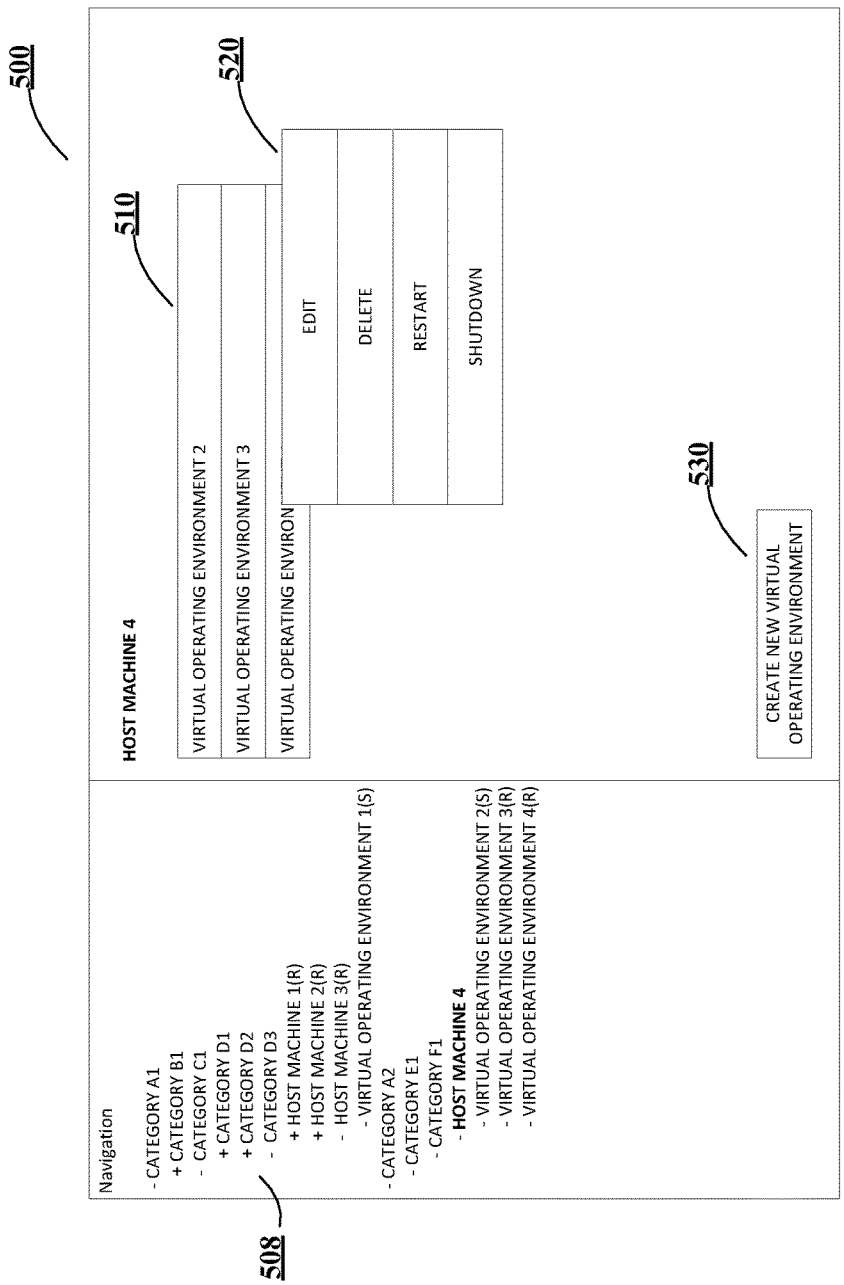
Figure 6:
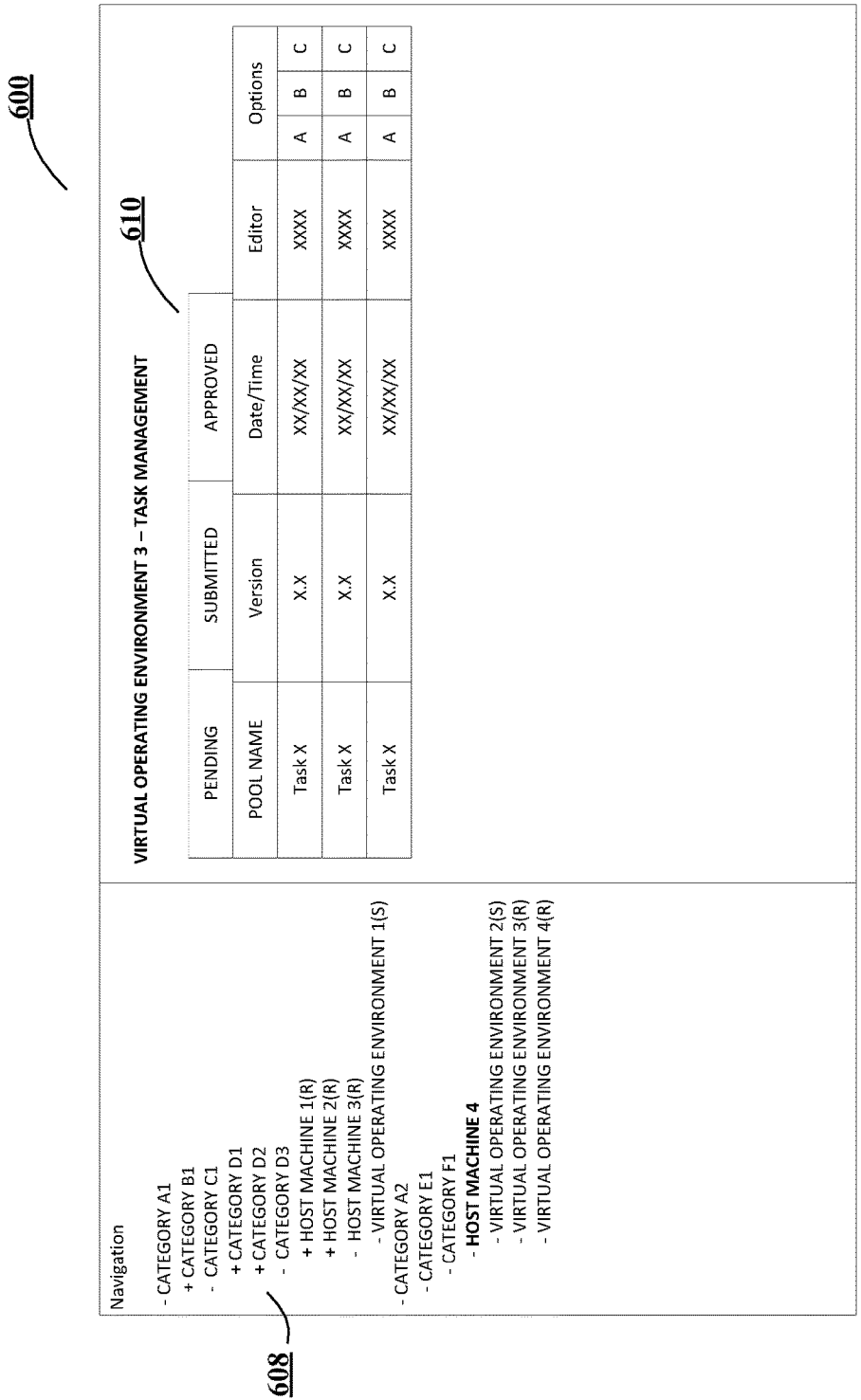
Figure 7:
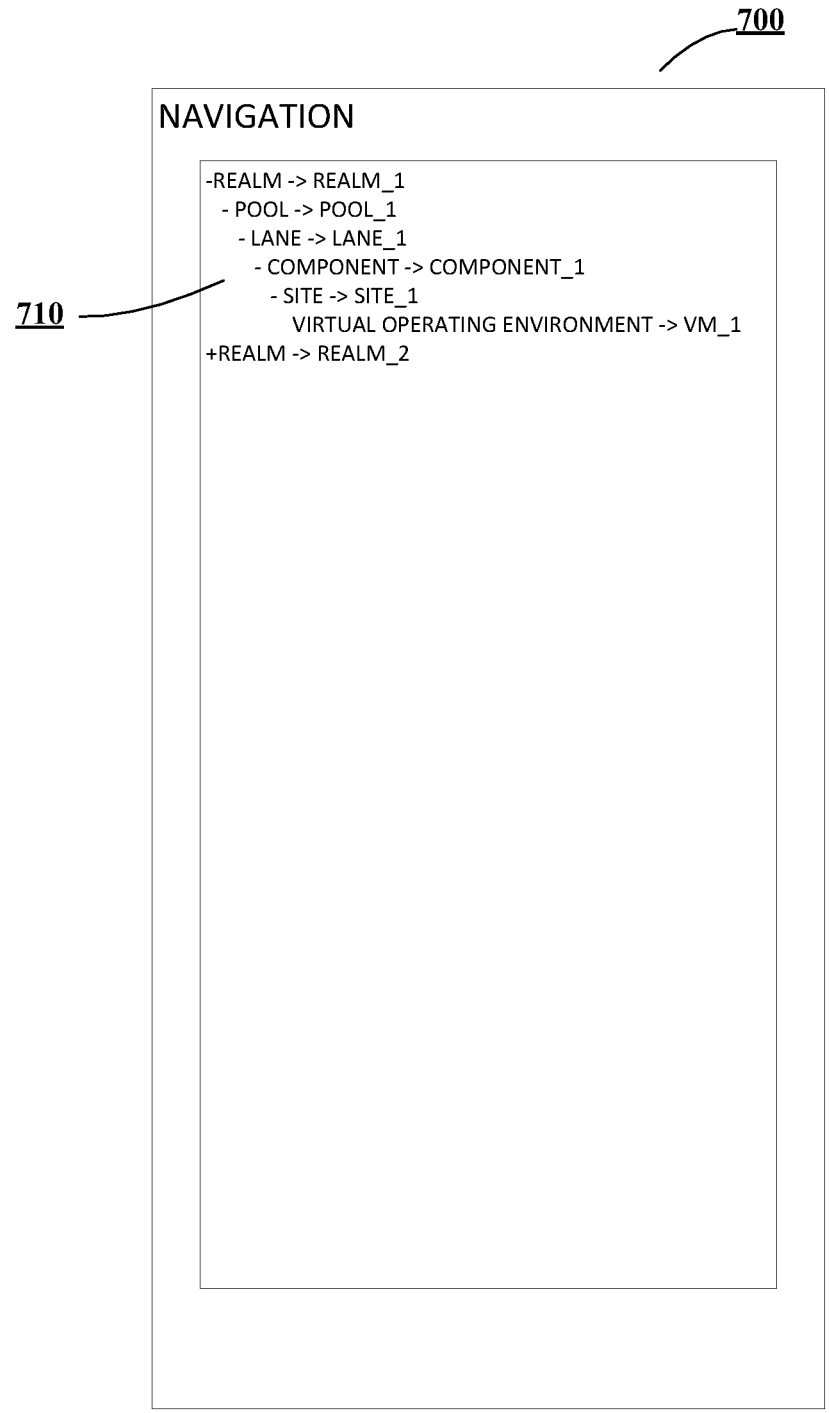

Having thus described embodiments of the invention in general terms, reference will now be made to the accompanying drawings, where:

FIG. 1 is a diagram illustrating a networking environment system, in accordance with embodiments of the present invention;

FIG. 2A is a block diagram illustrating a host machine that is configured to create and host virtual operating environments, in accordance with the various embodiments of the present invention;

FIG. 2B is a block diagram illustrating a repository for organizing business structure, in accordance with various embodiments of the present invention;

FIG. 3 is a high level process flow for streamlining customer finance and customer money management platforms and providing a financial institution product application overlay for customer money management, in accordance with embodiments of the present invention;

FIG. 4 illustrates a dashboard for enabling a user to view information related to a business structure, and perform requests to update a virtual operating environment;

FIG. 5 illustrates a dashboard for requesting a virtual operating environment perform a function in accordance with various embodiments of the present invention;

FIG. 6 illustrates a dashboard for managing maintenance tasks for a host machine and/or virtual operating environment, in accordance with various embodiments of the present invention; and FIG. 7 illustrates a user interface for navigating a business structure, in accordance with various embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" may refer to a business entity that is either maintaining or acting on behalf of an entity maintaining one or more databases for monitoring and housing data. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "user" or "client" in the context of this case may be a system or a computer user.

Referring to FIG. 1, a network environment is illustrated in accordance with embodiments of the present invention. As illustrated in FIG. 1, the host control system 102 is operatively coupled via a network 110 to the user computing device 140 and/or a repository 106. In this configuration, the host control system 102 may send information to and receive information from the user computing device 140 and/or the repository 106. Additionally, the user computing device 140 may send and receive information directly from the repository 106. The host control system 102 may be or include communication interfaces 142. FIG. 1 illustrates only one example of an embodiment of a network environment 100, and it will be appreciated that in other embodiments one or more of the systems, devices, or servers may be combined into a single system, device, or server, or be made up of multiple systems, devices, or server.

The network 110 may be a global area network (GAN), such as the Internet, a wide area network (WAN), a local area network (LAN), a telecommunication network or any other type of network or combination of networks. The network 110 may provide for wire line, wireless, or a combination wire line and wireless communication between devices on the network 110.

As illustrated in FIG. 1, the host control system 102 generally comprises a communication device 142, at least one processor 144, and a memory device 146. As used herein, the term "processor" or "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the host control system 102 are allocated between these processing devices according to their respective capabilities. The processing device may include functionality to operate one or more software programs based on computer readable instructions thereof, which may be stored in a memory device.

The processor 144 is operatively coupled to the communication interface 142 to communicate with the network 101 and other devices on the network 101. As such, the communication interface 142 generally comprises a modem, server, or other device for communicating with other devices on the network 101.

As further illustrated in FIG. 1, the host control system 102 comprises a control application 160. The control application 160 may perform one or more of the steps and/or sub-steps discussed herein and/or one or more steps not discussed herein. For example, in some embodiments, the control application 160 may generate a graphical representation of a business structure.

As illustrated in FIG. 1, the user computing device 140 generally comprises a communication interface 130, a processor 132, and a memory device 134. The processor 132 is operatively coupled to the communication device 130 and the memory device 134. In some embodiments, the processing device 132 may send or receive data from the user computing device 140, to the host control system 102 via the communication device 130 over a network 101. As such, the communication device 130 generally comprises a modem, server, or other device for communicating with other devices on the network 101.

As further illustrated in FIG. 1, the user computing device 140 comprises a client application 136 which is executable by the processor 132. In the embodiment illustrated in FIG. 1, the client application 136 allows the user computing device 140 to be linked to the host control system 102 to communicate, via a network 101. The client application 136 may also allow the user computing device 140 to connect directly (i.e. locally or device to device) with the repository 106 for sending and receiving information. The client application 136 may perform one or more of the steps and/or sub-steps discussed herein and/or one or more steps not discussed herein. For example, in some embodiments, the client application 136 may enable a user to interact with a graphical representation to communicate a request to the host control system 102 for causing a virtual operating environment to perform a function.

As further illustrated in FIG. 1, multiple virtualization host machines 180 are connected to the network 110. Each remote host machine may be a computing device capable of executing virtualization software 190 for creating, updating, and maintaining a virtual operating environment. The multiple virtualization host machines 180 are configured to communicate with the host control system 102 to receive instructions from the host control system 102 for causing a virtual operating to execute a function.

As further illustrated in FIG. 1, the repository 106 comprises computer readable instructions for creating and setting up a virtual operating environment, known as packages. In some embodiments, the repository 106 may act as a version management system. Where the repository 106 stores packages, the database may store versions of the package for updating the virtual operating environment. The repository 106 is connected to the network 110 and the repository 106 is configured to communicate with other devices over the network 110.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Referring now to FIG. 2A, a diagram of a virtualization host machine 180 is presented in accordance with various embodiments of the present invention. The host comprises at least one processor 182, a communication interface 184, and a memory device 186. The processor 182 is operatively coupled to the communication interface 184 and the memory 186. The processor 182 is operatively coupled to the communication interface 184 to communicate with the network 101 and other devices on the network 101. As such, the communication interface 184 generally comprises a modem, server, or other device for communicating with other devices on the network 101.

In some embodiments, the memory device 186 of the virtualization host machine 180 comprises a virtualization application 188, and a virtual operating environment 190. The virtualization application 188 causes the processor 182 to receive instructions from the host control system 102 for creating, upgrading, and maintaining a virtual operating environment 190. The virtualization application 188 further instructs the processor 182 to allocate hardware resources (e.g. processing power, and memory) to the virtual operating environment 190. Further, the virtualization application 188 causes the processor 182 to communicate with the host control system 102 to receive instructions on causing the virtual operating environment 190 to perform a function.

The virtual operating environment 190 comprises at least an allocated memory 192 which further comprises virtual operating instructions 194, and a preconfigured application 196. The allocated memory 192 is allocated by the virtualization application 188 and is stored within the memory device 188. The virtual operating instructions 194 instruct the processing device 192 how to maintain the virtual operating environment 190. Since the virtual operating environment relies on hardware resources from the virtualization host machine 180, the virtual operating instructions 194 direct the processor 182 how to simulate hardware functionality. This simulation may include simulating a communication device to connect with and communicate over the network 110, running an operating system, and executing instructions as if the virtual operating environment 190 were a physical machine. The preconfigured application is similar to an application stored in memory and executed by a computing device. The preconfigured application 196 is executed by the processor 182 through the virtual operating environment 190 based on the virtual operating instructions 194.

Referring now to FIG. 2B, a block diagram illustrates an exemplary embodiment of the repository 106. The repository 106 comprises at least a relational database 200 and an object oriented database 204. The relational database 200 comprises at least business structure elements 202 stored in a relational database format. As is typical with a relational database, information is stored in a table structure. Each table of a relational database contains columns, where each column contains a given data type (e.g. number, text). A table may further comprise entries that define a particular instance of the table using the columns. Each entry must have a corresponding value for each column. For example, where the table defines a category, the table may have columns for a name of the category, and a description of the category. An entry may be made for the table where the name is "Category A" and the entry has a related description. With relational databases, an entry in a given table may reference another entry, where the entry is either from the same table or a separate table. Such references may be done using any relational method, where the methods include, but are not limited to, one-to-many, one-to-one, many-to-many, and the like.

The object oriented database 204 is similar to the relational database 200 in that it allows entries but the object oriented database 204 does not include a structure for defining the entry. Instead, the object oriented database 204 defines entries separately, even though they may contain attributes similar to another entry. The entry is an object 204 that comprises at least attributes. The attributes are defined in a key/value pair. Such attributes are stored in the object oriented database 204 as the virtual operating environmental attributes 208. For example, an object may define a virtual operating environment and one attribute of the virtual operating environment may be a name and a second attribute may be a network address. A second object may define a virtual operating environment and in addition to the two attributes of the first object, the second object further includes an attribute for defining ports. The object may be described in any standard notation but may include Extensive Markup Language (XML), Javascript Object Notation (JSON), and the like. In some embodiments, an object may include an attribute that defines executable code. Such code may be executed by a processor directly after it is compiled into machine code or may be interpreted by a scripting engine or the like. A scripting engine is executed by a processor directly and receives commands in run-time that cause the processor to perform a precompiled function. For example, a scripting engine may be configured to cause a processor to communicate a message when the scripting engine receives a related request. The request is interpreted by the scripting engine directly by means of the processor. Such code is represented by the functional instructions 210.

In one embodiment, the relational database 200 and the object oriented database 204 operate in tandem to store and organize the business structure. The main part of the business structure is defined in the business structure elements 202 which reference other business structure elements 202, as defined herein. Specifically the business structure elements 202 are nested in hierarchical format, where one business structure element 202 may reference multiple sub business structure elements 202 in a one-to-many relationship. A business structure elements 202 may further reference a virtual operating environment object 206 from the object oriented database 204. Thus, each virtual operating environment object 206 is defined by a series of business structure elements 202. Conversely, it should be noted that not all business structure elements 202 need to be tied to a virtual operating environment object 206.

It should be noted that the repository 106 may be a physical computing device comprising a processor, memory, and code stored in memory which causes the repository to perform the functions necessary for proper operation. In addition the repository 106 may further comprise a communication device that is attached to the network 110. The repository 106 may communicate with other devices on the network 110 to store and communicate information of the repository described herein.

Referring now to FIG. 3, a method 300 to implement a comprehensive system for operating a virtual operating environment 190 over a distributed network 110 is illustrated in accordance with one embodiment of the present invention, which will be discussed in further detail throughout this specification. As illustrated, the method may comprise a plurality of steps, including but not limited to, step 310 for creating a virtual operating environment 190 hosted by a virtualization host machine 180, step 320 for receiving a business structure for categorizing remote host machines, step 330 for categorizing the host machine using the business structure, step 340 for receiving a status of the virtual operating environment 190, step 350 for generating a graphical representation of the business structure for display via a user computing device 140, step 360 for receiving a request to perform a command for controlling the virtual operating environment 190, step 370 for communicating the command to the host machine causing the virtual operating environment 190 to perform a predefined function, step 380 for receiving an updated status based for the virtual operating environment 190 based on the host machine causing the virtual operating environment 190 to perform the predefined function, and step 390 for updating the graphical representation based on the updated status.

At step 310, the host control system 102 may first create a virtual operating environment 190 which is hosted by a host machine. The hosted machine may be accessed via a distributed network 110. The host machine is a physical machine with at least one processor, memory, and code stored in the memory which is executed by the processor. The host machine connects to the distributed network 110 via a communication device.

Each virtualization host machine 180 has virtualization software 190 stored in memory which is executed by the processor of the virtual machine. The virtualization host machine 180 is configured to create a virtual operating environment 190 when the machine receives an instruction to do so. Unlike the virtualization host machine 180, the virtual operating environment 190 is not a physical machine with a processor and memory. Instead, the virtualization host machine 180 mimics the operation of a physical machine by allocating processing functionality and memory to the virtual operating environment 190. However, the virtual operating environment 190 is capable of executing an operating system, storing information in memory, and executing run-time code. The virtual operating environment 190 is additionally capable of communicating to devices on the distributed network 110 via a virtualized communication device. The virtualized communication device communicates through the physical communication device of the virtualization host machine 180 in order to communicate messages over the distributed network 110. The virtualized communication device receives an address as if the virtualized communication device were actually a physical device connected to the distributed network 110. The virtualization host machine 180 allocates a portion of the memory of the virtualization host machine 180 for use by the virtual operating environment 190. This allocated memory 192 may be defined as a given size (e.g. 5 Gigabytes) or it may be allocated as needed by the virtual operating environment 190. Further, the memory allocated by the virtualization host machine 180 for use by the virtual operating environment 190 may be repositioned in memory as needed by the virtualization host machine 180, as is typical during a defragmentation process. In addition to the memory, processor, and communication device of the virtualization host machine 180, the virtual operating environment 190 may utilize other hardware of the virtualization host machine 180. For example, if user input devices are connected to the virtualization host machine 180, a user may interact with the virtual operating environment 190 using these same devices. Additionally, if the virtualization host machine 180 has an interchangeable storage medium (e.g. CD-ROM, Flash Memory), the virtual operating environment 190 may be granted access to these devices. Yet further, the virtual operating environment 190 may further be granted access to memory that is not necessarily allocated to the virtual operating environment 190. For example, the virtualization host machine 180 may be configured to host a file system, where the files may be accessed by application executed by the virtualization host machine 180. However, the virtualization host machine 180 may share the file system with the virtual operating environment 190 such that the virtual operating environment 190 would adopt the file system and access the file system directly. Further, such a sharing may be done using a network protocol such as File Transmission Protocol (FTP).

Generally, a virtualization host machine 180 may be instructed to create any number of virtual operating environments 190 but each environment may be limited based on the resources of the virtualization host machine 180. However, the virtualization host machine 180 may be configured to conserve resources available by starting up and stopping virtual operating environments 190.

In some embodiments, the host control system 102 interacts with the virtualization host machine 180 to create a virtual operating environment 190 on the virtualization host machine 180. The host control system 102 may instruct the virtualization host machine 180 to create a virtual operating environment 190 based on a given set of parameters. Such parameters may include, the amount of processing power of the virtualization host machine 180 the virtual operating environment 190 may utilize, the size of memory of the virtualization host machine 180 allocated to the virtual operating environment 190, a given operating system for the virtual operating environment 190 to run, directions on setting up virtualized communication devices for the virtual operating environment 190, and so forth. In some embodiments, based on receiving such an instruction, the virtualization host machine 180, using the virtualization software 190, creates the virtual operating environment 190 based on the parameters. The host control system 102 may be configured to perform a pre-creation checks to determine whether creating the virtual operating environment 190 is possible. For example, the host control system 102 may determine the amount of memory available to the virtualization host machine 180. The host control system 102 may compare the amount of memory available with the memory allocation size of the virtual operating system and determine whether such memory is sufficient. Based on determining that sufficient memory exists on the virtualization host machine 180, the host control system 102 instructs the virtualization host machine 180 to proceed with the creation of the virtual operating environment 190. Additionally, the host control system 102 may determine what virtual operating environments 190 may be already hosted by the virtualization host machine 180. The host control system 102 may perform an analysis to determine the criticality of the already hosted virtual operating environments 190. Such an analysis may determine that a given virtual operating environment 190 hosted on the virtualization host machine 180 requires a given amount of processing power to operate efficiently, an amount of processing power available by the virtualization host machine 180, and an amount the processing power would be decreased based on creating a subsequent virtual operating environment 190. If the decrease in processing power would be decreased below the requirements of the already hosted virtual operating environment 190, the host control system 102 may either not instruct the virtualization host machine 180 to create the virtual operating environment 190 or instruct the virtual virtualization host machine 180 to abort the installation of the virtual operating environment 190. Further analysis might include determining when each virtual operating environment 190 would require available resources. For example, a first virtual operating environment 190 may be setup to receive requests from a first country and a second virtual operating environment 190 may be setup to receive requests from a second country. Depending on the time of the day, the first and second virtual operating environments 190 may experience different levels of requests. Therefore, the virtualization host machine 180 may never be strained in resources. The host control system 102 may determine based on previous balance loads how to direct virtualization host machines 180 on creating virtual operating environments 190.

In addition to the operating system, the host control system 102 may direct the virtualization host machine 180 to further configure the virtual operating environment 190 to execute given software packages. For example, the host control system 102 may instruct a virtualization host machine 180 to configure the virtual operating environment 190 to operate a web server that processes negotiable instrument images. Such software packages may be bundled together with the operating system and stored in a repository 106 that is made available to the virtualization host machine 180. Therefore, the host control system 102 may simply need to direct the virtualization host machine 180 to create the virtual operating environment 190 using a predetermined bundle. In addition, the bundle may include other instructions for causing the virtualization host machine 180 to configure the virtual operating environment 190 upon creation. The bundles stored in the repository 106 may be created and updated using version controls. Therefore, in addition to the instruction which bundle to use, the host control system 102 may instruct the virtualization host machine 180 to create the virtual operating environment 190 using a specific version of the bundle. Such a practice simplifies creating virtual operating environments 190. As explained earlier, the host control system 102 may be configured to monitor resources of the virtualization host machine 180. As a virtualization host machine 180 hosting a virtual operating environment based on a given bundle becomes resource constrained, the host control system 102 may instruct a second virtualization host machine 180 to create a second virtual operating environment based on the same given bundle. Thus, increasing the amount of resources available for performing a given task. This is especially beneficial if the machines communicate with an outside storage system, such as a database. Therefore, each virtual operating environment is not reliant on information stored locally by other virtual operating environments 190 to function properly. The host control system 102 may be further configured, based on monitoring resources, to determine that a virtual operating environment 190 is not needed and configure a virtualization host machine 180 to terminate the virtual operating environment 190. Further, as will explained later, such version control bundling aids in simplifying updates to already existing virtual operating environments 190.

The host control system 102 may further configure the virtualization host machine 180 on how to control the virtual operating environment 190. The virtualization host machine 180 may be configured to control the virtual operating environment 190 based on receiving instructions over the distributed network 110. Such instructions might include, but are not limited to, starting the virtual operating environment 190, stopping the virtual operating environment 190, increasing the amount of allocated memory 192 available or processing power to the virtual operating environment 190, creating or terminating a virtualized communication device for the virtual operating environment 190, connecting the virtualized operating environment to hardware or other resources available to the virtualization host machine 180, and terminating the virtual operating environment 190. In other embodiments, the host control system 102 may configure the virtualization host machine 180 to setup triggers to perform such functions. Such triggers may be time based (i.e. expiration of a timer), or based on receiving status information from the virtual operating environment 190. For example, the host control system 102 may configure to virtualization host machine 180 to allocate additional memory to the virtual operating environment 190 when the current memory available to the virtual operating environment 190 exceeds a given threshold.

In some embodiments, the host control system 102 interacts with the virtualization host machine 180 using an Application Program Interface (API) to instruct the virtualization host machine 180 to create the virtual operating environment 190 or control the virtual operating environment 190. The virtualization host machine 180 may receive instructions using the API via the distributed network 110. As is typical with APIs, the virtualization host machine 180 may require authentication prior to receiving any instruction to setup or control the virtual operating environment 190.

At step 320, the host control system 102 receives a structure for categorizing virtualization host machines 180 located on the distributed network 110. In some embodiments, the business structure is based on a tiered hierarchical format, where each tier comprises attributes for defining the virtualization host machine 180. There are no limits to the number of tiers of the business structure or to the number of attributes associated with each tier. As an example, one tier of the business structure may define a location of the virtualization host machine 180. The attributes of the tier may represent countries, where each country listed is an attribute of the tier that will define the virtualization host machine 180. Based on the hierarchy of the business structure each tier may comprise sub tiers and a parent tier. At least one tier will be the root tier, where the root tier may have children but not a parent. There may be multiple root tiers. Each sub tier may define additional attributes of the virtualization host machine 180. For example, a sub tier may define a business group that manages the virtualization host machine 180. Therefore, a first tier may define the country of the virtualization host machine 180 and the sub tier defines the business group that manages the virtualization host machine 180. It is important to note that attributes of a sub tier are associated with the selected attribute of the parent tier and not the parent tier itself. Therefore, where the first tier defines Country A and Country B as attributes, when Country A is selected the sub tier may have for selection Business Group X and Business Group Y, while when Country B is selected, the sub tier may have for selection Business Group Z. In other embodiments, the sub tier itself may be associated with an attribute of the parent tier and not just the attributes of the sub tier. For example, where the parent group may define Country A and Country B as attributes. If Country A is selected, the sub tier may provide attributes for selecting a business group that manages the virtualization host machine 180, while if Country B is selected, the sub tier may provide attributes for selecting a vendor or third party entity that manages the virtualization host machine 180. Further if a Country C were available and selected, the sub tier for selecting Country C may display attributes that are not related to the management of the virtualization host machine 180. As more tiers are defined, more attributes may be associated with the virtualization host machine 180. The attributes may include, but are not limited to, business attributes (e.g. which business group manages the hot machine), technology attributes (e.g. operating system, processor, version of software bundle), organization attributes (e.g. age of virtualization host machine 180), and so forth.

Once the host control system 102 receives the business structure, the host control system 102 may categorize the virtualization host machine 180 as demonstrated in step 330. In categorizing the virtualization host machine 180, the host control system 102 associates the virtualization host machine 180 with at least one tiered attribute. Because of the tiered nature of the business structure, once a virtualization host machine 180 is associated with the tiered attribute, the virtualization host machine 180 assumes all attributes of all higher ranked tiers of the business structure. For example, a tiered business structure has a root tier for defining which country the virtualization host machine 180 is located, a sub tier to the root tier of the business group that manages the virtualization host machine 180, another sub tier that defines a data center where the virtualization host machine 180 is located, and another sub tier that defines the principal function of the virtualization host machine 180. The root tier may have an attribute of Country A, an attribute for the sub tier for Country A may be Business Group X, an attribute of the sub tier for Group X may be Datacenter 1, and an attribute for the sub tier of Datacenter 1 may be Check Processing. If the virtualization host machine 180 is associated with the Check Processing attribute, the virtualization host machine 180 is automatically associated with Datacenter 1, Group X, and Country A based on the hierarchical order of the business structure. It should be further noted that a virtual machine may be associated with an attribute in a tier above Check Processing. Following the example, if a virtualization host machine 180 were associated with Datacenter 1, the virtualization host machine 180 would automatically be associated with Business Group X, and Country A. However, the virtualization host machine 180 would not be associated with Check Processing.

Using this same structure it is possible to define virtual operating environments 190 the same way using an association between the virtual operating environment 190 and the virtualization host machine 180 that hosts the virtual operating environment 190. Therefore, where a virtualization host machine 180 is associated with an attribute of a tier, each virtual operating environment 190 being hosted on such a virtualization host machine 180 would be automatically associated with all the attributes of the virtualization host machine 180.

At step 340, the host control system 102 receives a status of the virtual operating environment 190. After the host control system 102 instructs the virtualization host machine 180 to create the virtual operating environment 190, the host control system 102 may receive status information regarding the virtual operating environment 190. This status information may include, but is not limited to, whether the virtual operating environment 190 is running or shutdown, whether the machine has experienced an error, an amount of memory that the is made available to the virtual operating environment 190, the amount of available memory that the virtual operating environment 190 is using, an amount of processing power that the virtual operating environment 190 is using, and the like. In some embodiments, the host control system 102 may further be configured to test the virtual operating environment 190. As explained previously, each virtual operating environment 190 may comprise software for performing a particular function. The host control system 102 may be configured to test the ability of the virtual operating environment 190 to perform this function. In some instances, the host control system 102 determines whether the virtual operating environment 190 is capable of performing the function error free or at all. In such an instance, the host control system 102 may communicate a request to the virtual operating environment 190 and expect to receive a response back from the virtual operating environment 190. The host control system 102 has an exemplary response to compare the actual response received. For example, where the virtual operating environment 190 is configured to process a check image into meta data, the virtual operating environment 190 returns a response of the meta data. The host control system 102 compares the response with predetermined meta data to determine whether the virtual operating environment 190 processed the check image correctly. If the predetermined response does not match the response from the computer, the host control system 102 may be configured to perform a function correct the abnormality. In other embodiments, where the virtual operating environment 190 does not generate a response, the host control system 102 may additionally perform a predetermined function. Such a function may include notifying a technician or user. Such response may further provide an indication of the status of the virtual operating environment 190.

At step 350, the host control system 102 generates a graphical representation of the business structure for display via a user computing device 140. The graphical representation provides a user interaction interface for receiving information related to each of the virtualization host machines 180. The host control system 102 may further enable the user to update the business structure and interact with the virtualization host machines 180 to perform functions on a virtual operating environment 190 hosted on the virtualization host machine 180. Specific embodiments of the graphical representation will be discussed in other sections of this specification. In some embodiments, in building the graphical representation, the host control system 102 may be configured to communicate with each of the virtualization host machines 180 over the distributed network 110 to receive information about the virtualization host machines 180 and also the virtual operating environments 190. For the host machine information, this information may include, but is not limited to, a name of the virtualization host machine 180, an identifier of the virtualization host machine 180, an address of the virtualization host machine 180, hardware specifications of the virtualization host machine 180, software installed on the virtualization host machine 180, available memory of the virtualization host machine 180, total memory installed on the virtualization host machine 180, a list of virtual operating environments 190 being hosted by the virtualization host machine 180, data transfer rates of the communication device of the virtualization host machine 180, functions that the virtual virtualization host machine 180 may perform by remote request, and the like. With respect to the virtual operating environments 190, the information might include status information of the virtual operating environment 190, available memory to the virtual operating environment 190, a list of functions which the virtual operating environment 190 may perform by remote request, and the like. The host control system 102 may include this information when generating the graphical representation.

At step 360, the host control system 102 receives a request to perform a command for controlling the virtual operating environment 190. In some embodiments, when the user interacts with the graphical representation, the host control system 102 receives may receive a request to perform a function on the virtual operating environment 190. In some embodiments, the host control system 102 receives the request using an API. The API may be require the request to include information relating to the virtualization host machine 180, the virtual operating environment 190, and a specific function that the user would like the virtual operating environment 190 to perform. It should be noted that the request for the virtual operating environment 190 to perform a function may be minimal in comparison commands and instructions necessary to actually enable the virtual operating environment 190 to actually perform the function. The request is merely an instruction to cause the host control system 102 and other computing devices to enable the virtual operating environment 190 and/or virtualization host machine 180 to perform the function.

In some embodiments, the host control system 102 may require authentication information in conjunction with the request. This information may be a standard username and password. In an Internet based environment, the authentication credentials may be created using cookies or session variables.

At step 370, the host control system 102 communicates the command to the virtualization host machine 180 causing the virtual operating environment 190 to perform a predefined function. Based on receiving the request the host control system 102 may first determine whether the request is valid. Where the request contains information related to the virtualization host machine 180 and virtual operating environment 190, the host control system 102 may determine whether the virtualization host machine 180 and/or virtual operating environment 190 exist and are capable of receiving instructions based on the request. Where the virtualization host machine 180 and/or virtual operating environment 190 do not exist or are not capable of receiving instructions, the host control system 102 may communicate a message stating that the virtualization host machine 180 and/or virtual operating environment 190 are not available. In other embodiments, where the host control system 102 requires authentication credentials, the host control system 102 may authenticate the credentials prior to instruction the virtualization host machine 180 and/or virtual operating environment 190.

After the host control system 102 determines that the virtualization host machine 180 and/or virtual operating environment 190 exist and are capable of receiving instructions, the host control system 102 may actually communicate instructions as necessary to cause the virtual operating environment 190 to perform the requested function. Various functions and will be described in further detail.

Several basic functions might include starting the virtual operating environment 190, stopping the virtual operating environment 190, and restarting the virtual operating environment 190. When the host control system 102 receives a request to perform one of these functions, the host control system 102 may communicate an instruction to the virtualization host machine 180, and more specifically virtualizing software executed by the virtualization host machine 180, to cause the virtual operating environment 190 to perform accordingly. The actual execution of these instructions may require multiple steps and processes executed by the virtualization host machine 180 and the virtual operating environment 190 respectively. For example, where the request is to start up a virtual operating environment 190, the host control system 102 may send an instruction to the virtualization host machine 180 to cause the virtual operating environment 190 to perform a boot-up sequence. The virtualization host machine 180 may in turn cause the virtualizing software to simulate a boot-up sequence of the virtual operating environment 190. As the virtual operating environment 190 is virtual, the boot-up sequence is performed by virtualizing steps that normally would be accomplished by hardware components of a machine. No actual power signals are sent to any hardware but instead the virtual operating environment 190 is generated based on stored instructions in memory and diverting processing power of the virtualization host machine 180. Once the virtual operating environment 190 has been booted, the virtualization host machine 180 may continue the boot sequence accessing components of the virtualization host machine 180 to access files, initiate communication ports, and so forth. The virtual operating environment 190 may act as an actual machine even though it is virtualized. Each phase of the startup process may be monitored by the virtualization host machine 180 and communicated back to the host control system 102.

More complex functions might include creating the virtual operating environment 190 and destroying the virtual operating environment 190. In the case of creating the virtual operating environment 190, the host control system 102 may receive information of the virtualization host machine 180 to determine whether the virtualization host machine 180 may actually be able to create and host the virtual operating environment 190. Such tests might include determining whether the virtualization host machine 180 has the processing power capable of hosting the virtual operating environment 190, and whether the virtualization host machine 180 has sufficient memory for creating the virtual operating environment 190. Where the virtual operating environment 190 is based on a package, as defined herein, these tests may be determined based on the package information. The tests may be further based on information relating to other virtual operating environments 190 hosted by the virtualization host machine 180. This information may include bandwidth requirements of the other virtual operating environments 190, expected memory requirements of the virtual operating environments 190, and criticality of the other virtual operating environments 190. For example, at times it might be necessary to restart a virtualization host machine 180 in order to configure a given virtual operating environment 190, by restarting the virtualization host machine 180 operating of the other virtual operating environments 190 might be interrupted. In such instances, rules may be established for the virtualization host machine 180 to prevent or limit the creation or updating of a virtual operating environment 190. Such rules may be based on the times when a virtual operating environment 190 may be created or updated.

After the host control system 102 has received the command to create the virtual operating environment 190 and the precondition tests have been met, the host control system 102 may receive information relating to the virtual operating environment 190. As explained earlier, this information may be based on a package that defines how to setup the virtual operating environment 190. In some embodiments, the information might include the amount of memory to allocate to the virtual operating environment 190, the processing power requirements for the virtual operating environment 190, communication device requirements, software installation instructions, and so forth. Where information is provided on setting up communication devices, the software may further setup safety devices such as firewalls. Such information may detail which ports are available for receiving communications and what protocols may be used over the ports. The instructions may further detail which software installed on the virtual operating environment 190 may be able to communicate using the communication devices.

After receiving the information, the host control system 102 may further send the instruction to the virtualization host machine 180 to create the virtual operating environment 190 based on the information. Where the creation is based on a package, the host control system 102 may instruct the virtual operating environment 190 how to receive the package. For example, the package may be stored in memory of a repository 106 and the instruction may be to communicate with the repository 106 to receive a copy of the package.

Once the virtualization host machine 180 receives the instruction, the virtualization host machine 180, using the virtualizing software, may create the virtual operating environment 190. This may include several steps and processes. The virtualization host machine 180 may communicate status information of creating the virtual operating environment 190 to the host control system 102. Once the creation process has been completed, the virtualization host machine 180 may perform a startup of the virtual operating environment 190 as explained herein.

In another embodiment, the host control system 102 may be able to receive requests to update the virtual operating environment 190, similar to the creation process. The host control system 102 may perform tests to determine whether the virtualization host machine 180 is capable of the upgrade. Additionally, the host control system 102 may instruct the virtualization host machine 180 to perform the update and receive information from the virtualization host machine 180 relating to the update process. Where the update is based on a package, the information may further include a version of the package.

At step 380, the host control system 102, using the same methods as explained herein, receives an updated status from the virtual operating environment 190. After the host control host control system 102 receives the updated status, the host control host control system 102 updates the graphical representation based on the updated status of the virtual operating environment 190, as explained in step 390. As explained above, the host control system 102 manipulates the graphical representation to provide indications to the user relating to the status of the virtualization host machine 180 and the virtual operating environment 190.

Referring now to FIG. 4, further embodiments of the invention are directed to demonstrating the generated representation of the business structure that is displayed on the user computing device 140 using a dashboard 400. A dashboard is provided with a graphical representation of the business structure. Examples of this dashboard are provided later in the specification. Dashboard 400 comprises at last a tree structure 410 and an information panel 420. The tree structure 410 is generated based on the business structure described herein. The tree structure 410 may have a hierarchical format where root nodes comprise children nodes. Each of the nodes of the tree structure 410 describes an attribute that is assignable to a host machine and/or a virtual operating environment hosted by the host machine. Nodes are linked in the hierarchical format to provide multiple attributed to each of the host machines and virtual operating environments. For example, a root node may describe a location of a data center (e.g. Data Center #1), a children node of the root node may describe a business team that is tasked with maintaining a host machine (e.g. Team A). Therefore, all host machines that are categorized under Team A would also be linked to Data Center #1. Any number of attributed may be linked together to describe the host machines and/or virtual operating environments using this hierarchical format.

The dashboard 400 may be configured to receive input from a user using the user computing device 140. The user may interact with the dashboard 400 using standard techniques which includes, but is not limited to, a mouse or keyboard, a touchscreen, voice recognition commands, and the like. The tree structure 410, wherein the tree structure comprises multiple nodes 412. The tree structure may be configured to receive input to enable a user to interact with each of the nodes of the tree structure 410. Interacting with the nodes 412 may cause the node 412 to expand and cause the user computing device 140 to display all children nodes 412 under the selected node 412. Further, if a node 412 is expanded (i.e. the children nodes are displayed), the user may interact with the node 412 to collapse the node 412 (i.e. hide all children nodes under the node). Further, each of the nodes 412 may be configured to be selectable. When a user interacts with the node 412 by selecting the node 412, the user computing device 140 may be configured to communicate with the host control system 102 to retrieve additional details related to the node 412. Such details are returned to the user computing device 140 and the user computing device 140 updates the dashboard 400 based on the details.

Where the node 412 is either a host machine 180 or a virtual operating environment 190 operated on the host machine, the node 412, each node may further comprise status indicator 414. Such status indicator may display a particular status of the virtual operating environment 190. For example, the status indicator 414 may display whether the host machine 180 or the virtual operating environment 190 is running or shutdown. The status indicator 414 may display any status of the virtual operating environment 190 or the host machine 180.

The details received from the host control system 102 may be displayed in the information panel 420. As embodied in FIG. 4, the information panel 420 may display the details in a table format using key/value pairs. The details may be unique to each of the one or more nodes. For example, a node describing an attribute of the host machine may include a name of the node, and other identifying information for the specific node. If the node described a physical location, the details for the node may include a mailing address, a contact phone number, and a name for a point of contact. If the described a management team, the details for the node may include a list of each of the team members with roles for each, and contact information for the team. If the node described a host machine, the details for the node may include, but are not limited to, the name of the host machine, a path or network address for the host machine, a reference to ports for interacting with the host machine (e.g. Port 22—SSH). Where the node describes a virtual operating environment, the details may include details similar to that of the host machine. This is possible because the virtual operating environment simulates an actual machine operating on the network and is given a physical address and is capable of opening ports for interacting with the virtual operating environment.

In some embodiments, the dashboard 400 may further enable a user to manipulate the tree format 410 and details contained in the information panel 420 for each of the nodes. For example, the dashboard 400 may enable a user to create a child node under a parent node, delete a child node, move child nodes to other parent nodes, and the like. In the information panel 420, the dashboard 400 may enable a user to update the details or create additional details.

In other embodiments, nodes of the tree structure may display status information relating to the nodes. For example, where the node describes a host machine, the node may present information related to the status of the host machine. This information may include an icon or a simple text.

Referring now to FIG. 5, FIG. 5 demonstrates a dashboard 500 in accordance with one embodiment of the invention. Dashboard 500 further comprises a navigation panel 608, a list of virtual operating environments 510 for a given host machine, an operation sub panel 520, and a virtual operating environment create button 530. When a user selects a host machine node, the user computing device 140 receives details from the host control system 102 related to the host machine. Such information may include the virtual operating environments that are hosted on the host machine. These virtual operating environments may be listed in the list of virtual operating environments 510. The list of virtual operating environments 510 may further define a running state of each of the virtual operating environments (e.g. running, starting up, and shutdown). The list of virtual operating environments 510 may be configured to allow a user to interact with a description of each of the virtual operating environments. When the user interacts with the description of the virtual operating environment, the user computing device 140 may update the dashboard to display the operation sub panel 520. The operating sub panel 520 enables a user to request the system perform a function on the virtual operating environments. As depicted in FIG. 5, the functions may include editing the details for the virtual operating environment, deleting the virtual operating environment, restarting the virtual operating environment, shutting down the virtual operating environment, and starting the virtual operating environment. It should be noted that when a user selects one of the options under the operating sub panel 520, the user computing device communicates a request to the host control system 102 for causing the host control system 102 to interact with the host machine and/or virtual operating environment to cause the virtual operating environment to perform the function, as defined herein. The options on the operating sub panel 520 may reference functions that either define the structure of the virtual operating environment or the functionality of the virtual operating environment. With respect to the options that define the structure of the virtual operating environment, a request may be made to the host control system 102 to update the structure of the virtual operating environment. Such request may cause the host control system 102 to interact with the repository 106 to create, edit, or update a virtual operating environment object 206 related to the virtual operating environment. In other embodiments, the host control system 102 may further update a business structure element 202 of the relational database. While in other embodiments, the host control system 102 may further update a reference of a business structure element 202 and another business structure element 202 or a virtual operating environment object 206.

With respect to the options on the operating sub panel 520 that define the functionality of the virtual operating environment, the host control system 102 may receive such functionality from the object oriented database 204 of the repository 106. Such functionality is defined by the functional instructions 210 related to a virtual operating environment object 206. As defined herein, the functional instructions 210 may be scripts that are executable by a scripting engine of the virtual operating environment. Thus the host control system 102 receives a request for a virtual operating environment to perform a given function 210. The host control system 102 may communicate with the object oriented database 204 to receive a virtual operating environment object 206 related to the virtual operating environment. Using the virtual operating environment object 206, the host control system 102 may determine a functional instruction 210 that corresponds to the request. The host control system 210 may communicate the functional instruction 210 to the virtual operating environment for a scripting engine to interpret the functional instruction 210, thus causing the virtual operating environment to perform a function associated with the functional instruction 210. In other embodiments, the functional instruction 210 may require variables to operate properly. A user may submit the variables through a graphical user interface which are relayed to the host control system 102. Prior to the host control system 102 communicating the functional instruction 210 to the virtual operating environment, the host control system 102 may update the functional instruction 210 with the variables. In other embodiments, the functional instruction 210 may include default variables. Therefore, if the user does not supply a variable, the host control system 102 may update the functional instruction 210 using the default variable.

Additionally, the dashboard 500 defined in FIG. 5 comprises the virtual operating environment create button 530. This button may be configured to allow a user to send a request to the host control system 102 to create a virtual operating environment for the selected host machine. The user computing device 140 may be configured to enable a user to submit information necessary to create the virtual operating environment, as defined herein. After the user submits the information, the user computing device 140 submits a request to the host control system 102, causing the host control system 102 to interact with the host machine to create the virtual operating environment.

Referring now to FIG. 6, FIG. 6 describes a dashboard 600 in accordance with one embodiment of the invention. Dashboard 600 comprises a navigation panel 608, a task management panel 610 for performing maintenance based tasks on a host machine or a virtual operating environment. As depicted in FIG. 6, the task management panel 610 comprises tabs for handling maintenance tasks. Such tabs may comprise a pending tab, a submitted tab, an approved tab, a completed tab, and a canceled tab. Each of the tabs are configured to enable a user to select a tab, thereby causing the user computing device 140 to update the dashboard 600 to display maintenance tasks for that area. Each of the maintenance tasks may be displayed in the dashboard 600 using a table format. The maintenance task may display information comprising a task name (e.g. cycle logs), a version, a date/time that describes the start date or due date of the task, a creator or editor of the task, and other options for the task.

In other embodiments of the present invention, the host control system 102 is further configured to monitor the status of the host machine and/or virtual operating environment to receive status information of the host machine and/or virtual operating environment, as explained herein. When the host control system 102 receives an updated status, the host control system 102 communicates with the user computing device 140 to display and update the display of the user computing device 140 with the updated status.

Referring now to FIG. 7, FIG. 7 illustrates a navigation panel 700 displaying a business structure 710 based on Business Process Management Notation (BPMN). The business structure 710 is similar to that described herein and includes a tree structure with multiple nodes. Using BPMN, each node of the business structure 710 is organized where the top node defines a realm. A sub node of the realm is a pool. A sub node of the pool is a lane. A sub node of the lane is a component. A sub node of the component is a site. A sub node of the site is virtual operating environment. Each of the terms (e.g. realm, pool, lane) are defined by the BPMN standards, which version is current (i.e. version 2.0) at the time of filing of this application or any previous version.

In other embodiments, the business structure may be based on Enterprise Integration Patterns as defined at the time of filing this application.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for operating a virtual operating environment over a distributed network, the system comprising:
   a memory;
   at least one computing processor; and
   a module stored in the memory, said module comprising instruction code executable by the at least one computing processor, and structured to cause the at least one computing processor to:
      create a virtual operating environment, wherein the virtual operating environment is hosted on a physical machine accessible via a distributed network, wherein the physical machine is configured to receive operational commands over the distributed network for controlling the virtual operating environment, wherein the virtual operating environment is virtualized by the physical machine, and wherein the virtual operating environment accesses hardware components of the physical machine to perform at least one preconfigured function;
      categorize the virtual operating environment using a tiered data structure, wherein each tier of the tiered data structure defines an attribute for categorizing the virtual operating environment, wherein each tier of the multiple tiered data structure may comprise one or more sub-tiers, thereby forming a parent/child relationship, wherein the sub-tier is associated with the attribute of each parent tier, wherein categorizing the virtual operating environment comprises assigning the virtual operating environment to a selected tier of the tiered data-structure such that the virtual operating environment is defined by the attribute of the selected tier and attributes of each parent tier of the selected tier;
      generate a graphical representation of the tiered data structure for display via a user computing device, wherein the graphical representation of the tiered data structure illustrates at least each of the tiers of the tiered data structure in a hierarchical format, and illustration of the physical machine displayed under at least one of the tiers of the tiered data structure, and an illustration of the virtual operating environment displayed under the illustration of the physical machine, wherein the illustration of the virtual operating environment enables a user to communicate an operational request to cause the virtual operating environment to perform a function associated with the operational request, wherein the illustration of the virtual operating environment comprises an operational status of the virtual operating environment, wherein the illustration of the physical machine accessible via the distributed network enables the user to communicate a second request to perform at least one command to control the physical machine, and wherein the illustration of the physical machine comprises a graphical representation of the operational status of the physical machine;

communicate a first command to the physical machine for causing the virtual operating environment to perform the function associated with the operational request based on the user interacting with the illustration of the virtual operating environment of the graphical representation of the tiered data structure;

receive, from the virtual operating environment, an updated status based on the virtual operating environment executing the function associated with the operational request;

update the illustration of the virtual operating environment based on receiving the updated status;

determine that creating a second virtual operating environment will not cause an amount of processing power available to the virtual operating environment to decrease below a defined threshold;

communicate a second command to the physical machine causing the second virtual operating environment to be created based on determining that creating the second virtual operating environment will not cause the amount of processing power available to the virtual operating environment to decrease below the defined threshold;

determine that the second virtual operating environment operates in tandem with the virtual operating environment;

receive a request to startup the second virtual operating environment;

determine that the virtual operating environment is not running;

communicate a command to the physical machine causing the virtual operating environment to startup;

determine that the virtual operating environment is running; and communicate a command causing the second virtual operating environment to startup.

2. The system of claim 1, wherein the module further comprises instruction code configured to cause the at least one computing processor to:

receive authentication information of the user; and
validate the authentication information of the user, and wherein, communicating the first command to the physical machine is further based on validating the authentication information of the user.

3. The system of claim 1, wherein the function associated with the operational request may be at least one of a command to shut down the virtual operating environment, a command to startup the virtual operating environment, or a command to reboot the virtual operating environment.

4. The system of claim 1, wherein the module further comprises instruction code configured to cause the at least one computing processor to receive the second request to perform the at least one command for controlling the physical machine based on the user interacting with the illustration of the physical machine; communicate an instruction to the physical machine, thereby causing the physical machine to execute a function associated with the at least one command to control the physical machine; and update the illustration of the physical machine.

5. The system of claim 1, wherein the module further comprises instruction code configured to cause the at least one computing processor to:

receive a request to create the second virtual operating environment on the physical machine.

6. The system of claim 1, wherein the module further comprises instruction code configured to cause the at least one computing processor to:

identify that the virtual operating environment has experienced an error; and
update the illustration of the virtual operating environment based on identifying that the virtual operating environment has experienced the error.

7. The system of claim 1, wherein module further comprises instruction code configured to cause the at least one computing processor to create a plurality of copies of the virtual operating environment, wherein at least one of the plurality of copies of the virtual operating environment is a testing environment, and wherein at least one of the plurality of copies of the virtual operating environment is a production environment.

8. The system of claim 1, wherein module further comprises instruction code configured to cause the at least one computing processor to:

create a trigger for communicating at least one of the operational commands to the physical machine; and
communicate at least one command of a list of commands based on an occurrence of the trigger.

9. The system of claim 8, wherein the occurrence of the trigger is based on at least one of an occurrence of a predetermined period of time, or receiving a computer generated instruction over the distributed network.

10. A computer program product for operating a virtual operating environment over a distributed network, the computer program product comprising a non-transitory computer-readable medium comprising code causing a computer to:

create a virtual operating environment, wherein the virtual operating environment is hosted on a physical machine accessible via a distributed network, wherein the physical machine is configured to receive operational commands over the distributed network for controlling the virtual operating environment, wherein the virtual operating environment is virtualized by the physical machine, and wherein the virtual operating environment accesses hardware components of the physical machine to perform at least one preconfigured function;

categorize the virtual operating environment using a tiered data structure, wherein each tier of the tiered data structure defines an attribute for categorizing the virtual operating environment, wherein each tier of the multiple tiered data structure may comprise one or more sub-tiers, thereby forming a parent/child relationship, wherein the sub-tier is associated with the attribute of each parent tier, wherein categorizing the virtual operating environment comprises assigning the virtual operating environment to a selected tier of the tiered data-structure such that the virtual operating environment is defined by the attribute of the selected tier and attributes of each parent tier of the selected tier;

generate a graphical representation of the tiered data structure for display via a user computing device, wherein the graphical representation of the tiered data structure illustrates at least each of the tiers of the tiered data structure in a hierarchical format, and illustration of the physical machine displayed under at least one of the tiers of the tiered data structure, and an illustration of the virtual operating environment displayed under the illustration of the physical machine, wherein the illustration of the virtual operating environment enables a user to communicate an operational request to cause the virtual operating environment to perform a function associated with the operational request, wherein the illustration of the virtual operating environment comprises an operational status of the virtual operating environment, wherein the illustration of the physical machine accessible via the distributed network enables the user to communicate a second request to perform at least one command to control the physical machine, and wherein the illustration of the physical machine comprises a graphical representation of the operational status of the physical machine;

communicate a first command to the physical machine for causing the virtual operating environment to perform the function associated with the operational request based on the user interacting with the illustration of the virtual operating environment of the graphical representation of the tiered data structure;

receive, from the virtual operating environment, an updated status based on the virtual operating environment executing the function associated with the operational request;

update the illustration of the virtual operating environment based on receiving the updated status;

determine that creating a second virtual operating environment will not cause an amount of processing power available to the virtual operating environment to decrease below a defined threshold;

communicate a second command to the physical machine causing the second virtual operating environment to be created based on determining that creating the second virtual operating environment will not cause the amount of processing power available to the virtual operating environment to decrease below the defined threshold;

determine that the second virtual operating environment operates in tandem with the virtual operating environment;

receive a request to startup the second virtual operating environment;

determine that the virtual operating environment is not running;

communicate a command to the physical machine causing the virtual operating environment to startup;

determine that the virtual operating environment is running; and communicate a command causing the second virtual operating environment to startup.

11. The computer program product of claim 10, wherein the non-transitory computer-readable medium further comprises code that causes the computer to:
receive authentication information of the user; and
validate the authentication information of the user, and wherein, communicating the first command to the physical machine is further based on validating the authentication information of the user.

12. The computer program product of claim 10, wherein the non-transitory computer-readable medium further comprises code that causes the computer to:
receive the second request to perform the at least one command for controlling the physical machine based on the user interacting with the illustration of the physical machine;
communicate an instruction to the physical machine, thereby causing the physical machine to execute a function associated with the at least one command to control the physical machine; and
update the illustration of the physical machine.

13. The computer program product of claim 10, wherein the non-transitory computer-readable medium further comprises code that causes the computer to: receive a request to create the second virtual operating environment on the physical machine.

14. The computer program product of claim 10, wherein the non-transitory computer-readable medium further comprises code that causes the computer to identify that the virtual operating environment has experienced an error; and update the graphical representation of the virtual operating environment based on identifying that the virtual operating environment has experienced the error.

15. The computer program product of claim 10, wherein the non-transitory computer-readable medium further comprises code that causes the computer to create a plurality of operating environments for the virtual operating environment, wherein at least one of the plurality of operating environments is a testing environment, and wherein at least one of the plurality of operating environments is a production environment.

16. A computer implemented method for operating a virtual operating environment over a distributed network, the method comprising using one or more processors for:
creating a virtual operating environment, wherein the virtual operating environment is hosted on a physical machine accessible via a distributed network, wherein the physical machine is configured to receive operational commands over the distributed network for controlling the virtual operating environment, wherein the virtual operating environment is virtualized by the physical machine, and wherein the virtual operating environment accesses hardware components of the physical machine to perform at least one preconfigured function;

categorizing the virtual operating environment using a tiered data structure, wherein each tier of the tiered data structure defines an attribute for categorizing the virtual operating environment, wherein each tier of the multiple tiered data structure may comprise one or more sub-tiers, thereby forming a parent/child relationship, wherein the sub-tier is associated with the attribute of each parent tier, wherein categorizing the virtual operating environment comprises assigning the virtual operating environment to a selected tier of the tiered data-structure such that the virtual operating environment is defined by the attribute of the selected tier and attributes of each parent tier of the selected tier;

generating a graphical representation of the tiered data structure for display via a user computing device, wherein the graphical representation of the tiered data structure illustrates at least each of the tiers of the tiered data structure in a hierarchical format, and illustration of the physical machine displayed under at least one of the tiers of the tiered data structure, and an illustration of the virtual operating environment displayed under the illustration of the physical machine, wherein the illustration of the virtual operating environment enables a user to communicate an operational request to cause the virtual operating environment to perform a function associated with the operational request, wherein the illustration of the virtual operating environment comprises an operational status of the virtual operating environment, wherein the illustration of the physical machine accessible via the distributed network enables the user to communicate a second request to perform at least one command to control the physical machine, and wherein the illustration of the physical machine comprises a graphical representation of the operational status of the physical machine;

communicating a first command to the physical machine for causing the virtual operating environment to perform the function associated with the operational request based on the user interacting with the illustration of the virtual operating environment of the graphical representation of the tiered data structure;

receiving, from the virtual operating environment, an updated status based on the virtual operating environment executing the function associated with the operational request;

updating the illustration of the virtual operating environment based on receiving the updated status;

determining that creating a second virtual operating environment will not cause an amount of processing power available to the virtual operating environment to decrease below a defined threshold;

communicating a second command to the physical machine causing the second virtual operating environment to be created based on determining that creating the second virtual operating environment will not cause the amount of processing power available to the virtual operating environment to decrease below the defined threshold;

determining that the second virtual operating environment operates in tandem with the virtual operating environment;

receiving a request to startup the second virtual operating environment;

determining that the virtual operating environment is not running;

communicating a command to the physical machine causing the virtual operating environment to startup;

determining that the virtual operating environment is running; and communicate a command causing the second virtual operating environment to startup.

17. The computer implemented method of claim 16, the method further comprising:

receiving authentication information of the user; and validating the authentication information of the user, and wherein, communicating the first command to the physical machine is further based on validating the authentication information of the user.

18. The computer implemented method of claim 16, the method further comprising:

receiving the second request to perform the at least one command for controlling the physical machine based on the user interacting with the illustration of the physical machine;

communicating an instruction to the physical machine, thereby causing the physical machine to execute a function associated with the at least one command to control the physical machine; and updating the illustration of the physical machine.

19. The computer implemented method of claim 16, further comprising:

receiving a request to create the second virtual operating environment on the physical machine.

20. The computer implemented method of claim 16, further comprising:

identifying that the virtual operating environment has experienced an error; and updating the graphical representation of the virtual operating environment based on identifying that the virtual operating environment has experienced the error.

* * * * *